(12) United States Patent
Horiguchi

(10) Patent No.: US 9,756,210 B2
(45) Date of Patent: Sep. 5, 2017

(54) IMAGE READER AND IMAGE FORMING APPARATUS INCLUDING SAME

(71) Applicant: KYOCERA Document Solutions Inc., Osaka (JP)

(72) Inventor: Yasuyuki Horiguchi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/218,894

(22) Filed: Jul. 25, 2016

(65) Prior Publication Data

US 2017/0034387 A1  Feb. 2, 2017

(30) Foreign Application Priority Data

Jul. 29, 2015 (JP) .................................. 2015-149618

(51) Int. Cl.
| | | |
|---|---|---|
| H04N 1/04 | (2006.01) | |
| H04N 1/203 | (2006.01) | |
| H04N 1/00 | (2006.01) | |
| H04N 1/12 | (2006.01) | |
| H04N 1/028 | (2006.01) | |

(52) U.S. Cl.
CPC ......... *H04N 1/203* (2013.01); *H04N 1/00602* (2013.01); *H04N 1/00795* (2013.01); *H04N 1/02815* (2013.01); *H04N 1/121* (2013.01); *H04N 2201/0081* (2013.01)

(58) Field of Classification Search
CPC ........ H04N 1/12; H04N 1/1235; H04N 1/125; H04N 1/2032; H04N 1/4076; H04N 1/486; H04N 5/361; H04N 1/00602; H04N 1/00769; H04N 1/02815; H04N 1/0402; H04N 1/0411; H04N 1/1008; H04N 2201/0081
USPC ....... 358/461, 474, 486, 453, 488, 505, 445, 358/446, 450, 465, 468, 475, 483, 494, 358/496, 497; 382/274, 317, 141, 149, 382/154, 167, 169, 175, 251, 266, 282, 382/284, 312, 313, 315, 318
See application file for complete search history.

(56) References Cited

U.S. PATENT DOCUMENTS

2007/0103735 A1* 5/2007 Ikeno ................. H04N 1/00681
358/449
2007/0127087 A1* 6/2007 Nabemoto ......... H04N 1/00358
358/468

(Continued)

FOREIGN PATENT DOCUMENTS

JP    2008-259054 A    10/2008
JP    2013-141079 A    7/2013

*Primary Examiner* — Negussie Worku
(74) *Attorney, Agent, or Firm* — Stein IP, LLC

(57) ABSTRACT

An image reader of the present disclosure includes a contact glass, an automatic document feeder, a first reading module, and a second reading module. The first and second reading modules each acquire black reference data through reading performed by a sensor with a light source turned off, and acquires white reference data through reading performed by the sensor at a position facing a white reference plate with the light source turned on. In a case of performing continuous one-side reading by means of the first reading module, based on a sensor output value of the second reading module in the continuous one-side reading, it is determined whether it is necessary for the first reading module to reacquire the black reference data or the white reference data.

8 Claims, 4 Drawing Sheets

(56) References Cited

U.S. PATENT DOCUMENTS

| | | | |
|---|---|---|---|
| 2008/0112017 A1* | 5/2008 | Nagasaka | H04N 1/4076 358/461 |
| 2008/0231918 A1* | 9/2008 | Nagase | H04N 1/486 358/483 |
| 2010/0214624 A1* | 8/2010 | Sakaue | H04N 1/203 358/448 |
| 2011/0013238 A1* | 1/2011 | Kamio | H04N 1/00002 358/475 |
| 2011/0102864 A1* | 5/2011 | Ishikawa | H04N 1/00649 358/498 |
| 2012/0044543 A1* | 2/2012 | Mikami | H04N 1/40056 358/461 |
| 2012/0307321 A1* | 12/2012 | Nagasaka | H04N 1/4095 358/475 |
| 2013/0256701 A1* | 10/2013 | Yang | H01L 21/3247 257/77 |
| 2013/0258422 A1* | 10/2013 | Yamamoto | H04N 1/1061 358/474 |
| 2013/0335754 A1* | 12/2013 | Utsunomiya | H04N 1/00809 358/1.5 |
| 2014/0211269 A1* | 7/2014 | Yamamoto | H04N 1/00127 358/444 |
| 2015/0288837 A1* | 10/2015 | Morikawa | H04N 1/00729 358/474 |
| 2015/0288844 A1* | 10/2015 | Enomoto | H04N 1/00551 358/474 |
| 2015/0381854 A1* | 12/2015 | Horiguchi | H04N 1/4076 358/406 |
| 2017/0041492 A1* | 2/2017 | Mori | H04N 1/00087 |

* cited by examiner

IMAGE READER AND IMAGE FORMING APPARATUS INCLUDING SAME

INCORPORATION BY REFERENCE

This application is based upon and claims the benefit of priority from the corresponding Japanese Patent Application No. 2015-149618 filed on Jul. 29, 2015, the entire contents of which are incorporated herein by reference.

BACKGROUND

The present disclosure relates to an image reader that reads a document sheet by scanning and is used in apparatuses such as, for example, digital copiers and image scanners, and an image forming apparatus including the same.

Some conventional image readers incorporated in multi-function peripherals and the like employing an electrophotographic process are provided with an automatic document feeder configured to convey document sheets one by one to a document table (a contact glass) for reading, the document sheets each being discharged from the document table after being read. In such an image reader, two reading methods can be performed, namely, a sheet through method and a sheet stationary method. In the sheet through method, document reading is performed by automatically feeding document sheets by means of an automatic document feeder with a reading module maintained stationary at an image reading position. In the document stationary method, document reading is performed by moving the reading module for scanning, and a user opens and closes a document presser upon every completion of reading in order to replace a document sheet on the document table (contact glass) one by one.

In recent years, the mainstream of the sheet through method mentioned just above has been a simultaneous two-side reading method in which images printed on front and back sides of a two-sided document sheet are read simultaneously by using different reading modules in one document conveyance operation performed by an automatic document feeder.

For correction of uneven illumination in a main scanning direction attributable to a light source incorporated in a reading module, lens vignetting, and uneven pixel sensitivity of a reading sensor, before reading a document sheet, shading correction is performed in which white reference is acquired by reading a white reference plate by means of a reading module, while black reference is acquired with a light source of a reading module turned off.

In such an image reader, when continuously reading a plurality of document sheets, image quality may be degraded due to, for example, image density variation caused by a temperature rise in a reading sensor or a light source, or a streaked image caused by adhesion of foreign objects such as paper powder to an image reading position.

There is known a method of reducing image density variation, against temperature rise in a reading sensor or a light source by, for example, correcting white reference data and black reference data in an interval between continuously conveyed document sheets based on a value read by the reading sensor. There is also known a method of reducing occurrence of streaked image, against adhesion of a foreign object such as paper powder to an image reading position by, for example, changing the reading position based on a value read by the reading sensor in an interval between document sheets conveyed in a continuous manner.

SUMMARY

According to one aspect of the present disclosure, an image reader includes a contact glass, an automatic document feeder, a first reading module, and a second reading module. The contact glass is fixed to an upper surface of a scanner frame, and divided into a manual document reading glass and an automatic document reading glass. The automatic document feeder is openable and closable with respect to the contact glass in an up-down direction, and conveys a document sheet to an upper surface of the automatic document reading glass. The first reading module is disposed below the contact glass so as to be reciprocatable in a sub scanning direction, capable of reading an image on a front side of a document sheet laid on the manual document reading glass while moving in the sub scanning direction, and also capable of reading an image on a front side of a document sheet conveyed to the upper surface of the automatic document reading glass while remaining stationary at a reading position that faces the automatic document reading glass. The second reading module is disposed inside the automatic document feeder, and capable of reading an image on a back side of a document conveyed to the upper surface of the automatic document reading glass. Here, the first reading module and the second reading module each include a light source and a sensor that reads, as image light, reflection light of light emitted from the light source. The first reading module and the second reading module are each capable of performing shading correction in which black reference data is acquired through reading performed by the sensor with the light source turned off, and white reference data is acquired through reading performed by the sensor at a position facing a white reference plate, with the light source turned on. In a case of performing continuous one-side reading in which the first reading module continuously reads images on front sides of document sheets, it is determined, based on a sensor output value obtained in reading performed by the second reading module in the continuous one-side reading, whether it is necessary for the first reading module to reacquire the black reference data or the white reference data.

Further features and specific advantages of the present disclosure will become apparent from the following descriptions of preferred embodiments.

DETAILED DESCRIPTION

Figure 1:
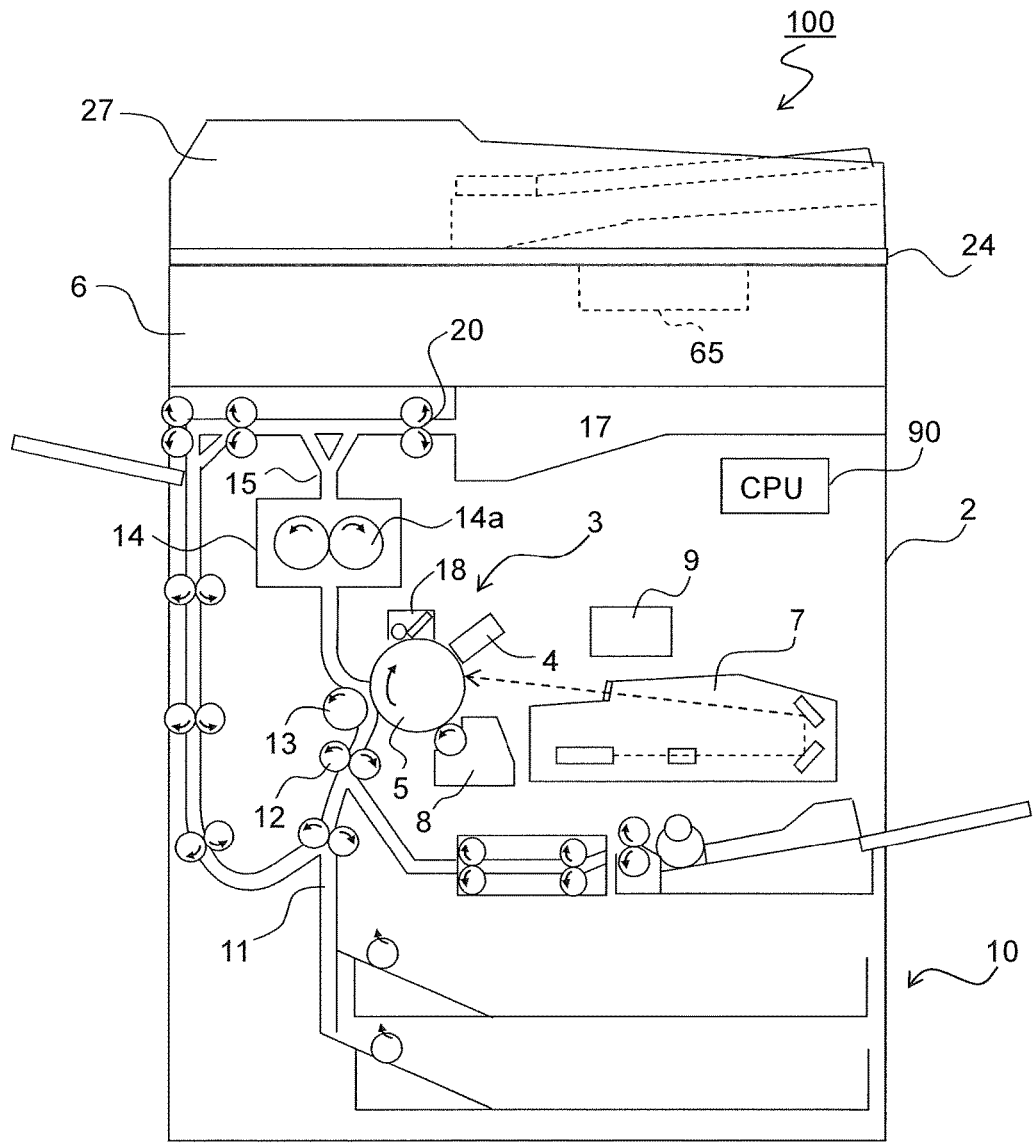
FIG. 1 is a side sectional view showing an overall configuration of an image forming apparatus 100 including an image reading portion 6 of the present disclosure.

Hereinafter, embodiments of the present disclosure will be described with reference to the accompanying drawings. FIG. 1 is a schematic configuration diagram of an image forming apparatus 100 including an image reading portion 6 of the present disclosure. In FIG. 1, in the image forming apparatus 100 (here, a digital multifunction peripheral (MFP) is shown as an example), in performing a copying operation, image data of a document sheet is read and converted into an image signal at the image reading portion 6, which will be described later. On the other hand, in an image forming portion 3 within an MFP main body 2, a photosensitive drum 5, which rotates in a clockwise direction as seen in FIG. 1, is electrically charged uniformly by a charging unit 4. Then, by a laser beam emitted from an exposure unit (such as a laser scanning unit) 7, an electrostatic latent image based on the document image data read at the image reading portion 6 is formed on the photosensitive drum 5. Next, developer (hereinafter referred to as toner) is caused to adhere to the thus-formed electrostatic latent image by a developing unit 8, and thereby a toner image is formed. The toner is supplied to the developing unit 8 from a toner container 9.

Toward the photosensitive drum 5 on which the toner image has been formed as described above, a sheet is conveyed from a sheet feeding mechanism 10 via a sheet conveyance path 11 and a registration roller pair 12 to the image forming portion 3. The conveyed sheet passes through a nip portion between the photosensitive drum 5 and a transfer roller 13 (an image transfer portion), and thereby the toner image on the surface of the photosensitive drum 5 is transferred onto the conveyed sheet. Then, the sheet having the toner image transferred thereon is separated from the photosensitive drum 5, and conveyed to a fixing portion 14 having a fixing roller pair 14a, and there, the toner image is fixed on the sheet. After passing through the fixing portion 14, the sheet is discharged by a discharge roller pair 20 into an intra-body sheet discharge portion 17.

The image reading portion 6 is disposed in an upper part of the MFP main body 2. At an upper surface of the MFP main body 2, there is provided, in an openable and closable manner, a platen (a document presser) 24 for pressing and holding a document sheet laid on a contact glass 25 (see FIG. 2) of the image reading portion 6. An automatic document feeder 27 is provided on the platen 24.

Further, a control portion (CPU) 90 is disposed within the MFP main body 2, and controls operations of the image forming portion 3, the image reading portion 6, the automatic document feeder 27, etc.

Figure 2:
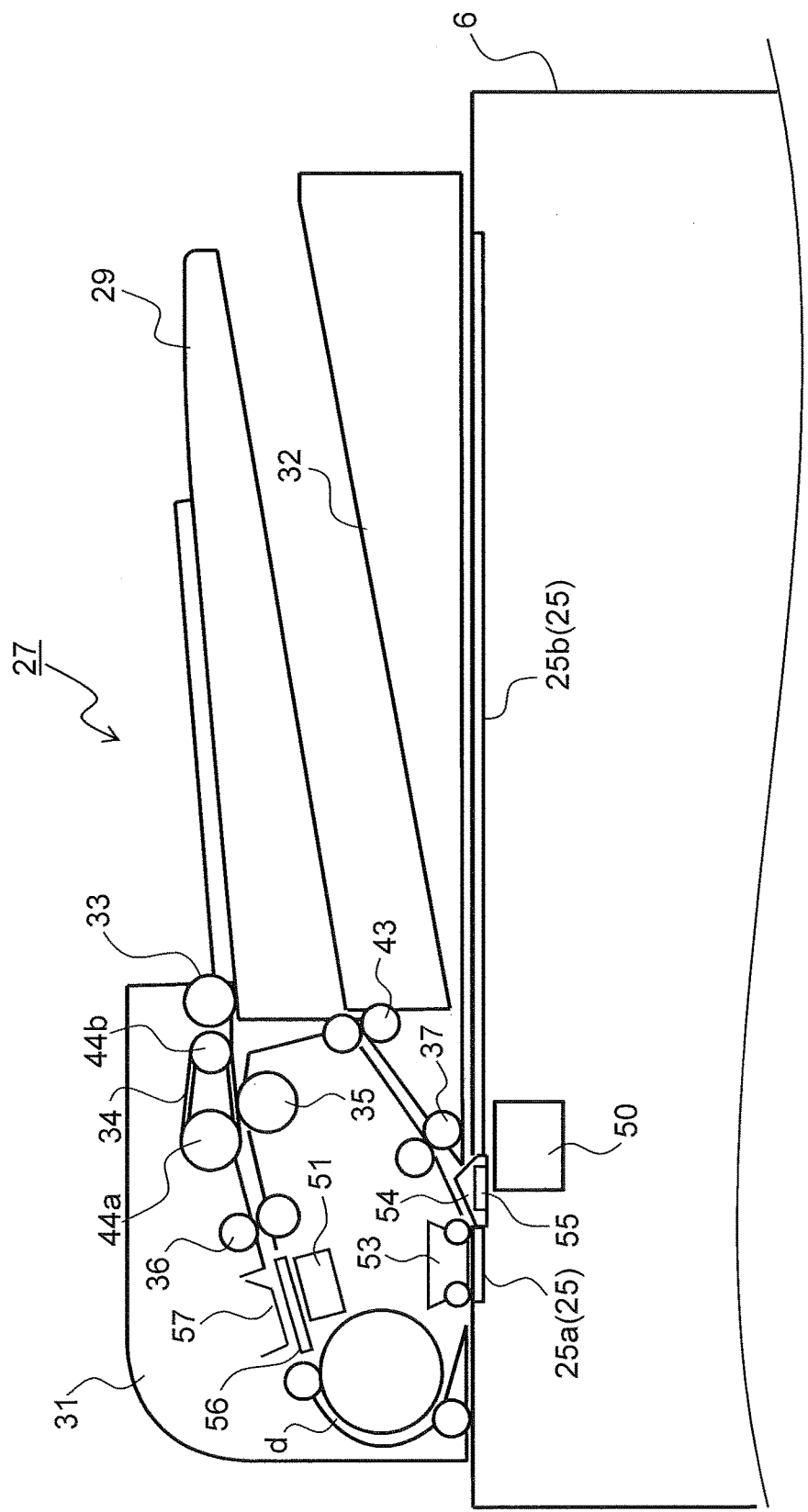
FIG. 2 is a side sectional view showing an internal structure of an image reading portion 6 according to an embodiment of the present disclosure, and an automatic document feeder 27 that automatically feeds a document sheet to the image reading portion 6.

FIG. 2 is a side sectional view showing an internal structure of an image reading portion 6 according to an embodiment of the present disclosure and an automatic document feeder 27 that automatically conveys a document sheet to the image reading portion 6. On an upper surface of the image reading portion 6, there is disposed a contact glass 25 composed of an automatic document reading glass 25a and a manual document reading glass 25b. Inside the image reading portion 6, a front-side reading module 50 is disposed. The front-side reading module 50 reads an image of a document sheet laid on the manual document reading glass 25b while moving in a sub scanning direction (a left-right direction as seen in FIG. 2). The front-side reading module 50 also reads an image on a front side of a document sheet conveyed by the automatic document feeder 27 while remaining stationary directly under the automatic document reading glass 25a.

Between the automatic document reading glass 25a and the manual document reading glass 25b, there is disposed a conveyance guide 54 that lifts up a leading end of a document sheet conveyed by the automatic document feeder 27. In a lower part of the conveyance guide 54, there is disposed a front-side white reference plate 55 for shading correction performed by the front-side reading module 50.

Inside a cover member 31 of the automatic document feeder 27, there is formed a document conveyance path d leading from a document feeding tray 29 to a document discharge tray 32. Along the document conveyance path d, there are provided a document conveyance member composed of a pickup roller 33, a document sheet feeding belt 34 and a separation roller 35, a registration roller pair 36, a conveyance roller pair 37, a discharge roller pair 43, etc., and a back-side reading module 51 that reads an image on a back side of a document sheet. Also, a back-side reading glass 56 is disposed adjacent to the back-side reading module 51. The back-side reading glass 56 constitutes a part of an interior wall surface of the document conveyance path d. Further, at a position facing the back-side reading glass 56 with the document conveyance path d therebetween, there is disposed a back-side white reference plate 57 for shading correction performed by the back-side reading module 51.

The document sheet feeding belt 34 is wound around and between a driving roller 44a and a driven roller 44b, and the separation roller 35 is disposed under the document sheet feeding belt 34 in contact with the document sheet feeding belt 34 with a predetermined pressure. A torque limiter is incorporated in the separation roller 35, and the separation roller 35 is configured to be driven to rotate along with the document sheet feeding belt 34 only when a rotation load is above a predetermined torque.

The document conveyance path d is curved so as to turn around in a part thereof from the registration roller pair 36 to the automatic document reading glass 25a. Also, at appropriate positions along the document conveyance path d, there are provided a plurality of sheet detection sensors (not shown) for detecting existence and absence, or passing, of a document sheet, including a feed sensor and a discharge sensor.

Next, a description will be given of a document feeding operation performed based on the sheet through method by using the automatic document feeder 27. In the sheet through method, a plurality of document sheets are set on the document feeding tray 29 with their image sides facing up. Then, when a copy-start button on an operation panel 65 (see FIG. 1) of the image forming apparatus 100 is pressed, a lift plate (not shown) is elevated by an elevator mechanism (not shown) to push up the pickup roller 33 via the document sheets. As a result, weight of a frame (not shown) including the pickup roller 33 is applied to the lift plate, whereby an upper surface of a document sheet is pressed against the pickup roller 33 with a predetermined pressure (document sheet feeding pressure).

Here, the pickup roller 33, the driving roller 44a, the driven roller 44b, and the document sheet feeding belt 34 are disposed in an unillustrated frame. The pickup roller 33 is coupled to the driving roller 44a by means of an unillustrated gear. When the driving roller 44a is caused to rotate by a roller driving motor (not shown), the document sheet feeding belt 34 stretched by the driving roller 44a and the driven roller 44b is driven to rotate, and the pickup roller 33 is also driven to rotate.

Of document sheets set on the document feeding tray 29, a top plurality of document sheets are sent by the pickup roller 33 to a nip portion between the document sheet feeding belt 34 and the separation roller 35. Then, only the topmost one of the top plurality of document sheets is separated from the other document sheets by the separation roller 35 to be conveyed toward the registration roller pair 36. Here, the document sheet is conveyed by a predetermined distance after a leading end of the document sheet is detected by the feed sensor. Then, the roller driving motor stops its operation to cause the rotational operation of the pickup roller 33 and of the document sheet feeding belt 34 to stop, and this completes a primary document sheet feeding. The primarily fed document sheet is caused to stop in a warped state with its leading end at a nip portion of the registration roller pair 36.

When a predetermined time has passed after the completion of the primary document sheet feeding, a secondary document sheet feeding is started. That is, by operation of a secondary document sheet feeding driving motor (not shown), the registration roller pair 36 is driven to rotate. The document sheet is conveyed by the registration roller pair 36 and the conveyance roller pair 37 toward the automatic document reading glass 25a. The document sheet conveyed to the automatic document reading glass 25a comes into contact with a document pressing member 53 disposed facing the automatic document reading glass 25a to be thereby pressed against the automatic document reading glass 25a from above. In this state, an image on the front side (the side facing the automatic document reading glass 25a) of the document sheet is read through the automatic document reading glass 25a by the front-side reading module 50.

Then, after passing over the automatic document reading glass 25a, the document sheet is conveyed via the conveyance guide 54 toward the conveyance roller pair 37 and the discharge roller pair 43, to be finally discharged by the discharge roller pair 43 onto the document discharge tray 32. Here, completion of image reading of one document sheet is determined to have been detected when the discharge sensor has detected passing of a rear end of the document sheet. The discharge sensor has a function of counting the number of document sheets each time document conveyance is completed. When the feed sensor has detected succeeding documents, document conveyance is performed with respect to a second and succeeding document sheets in the same manner as described above.

In a case of reading images of a two-sided document sheet, an image on a back side of the document sheet is read by the back-side reading module 51 provided upstream of the document pressing member 53, and then an image on a front side of the document sheet is read by the front-side reading module 50.

Figure 3:
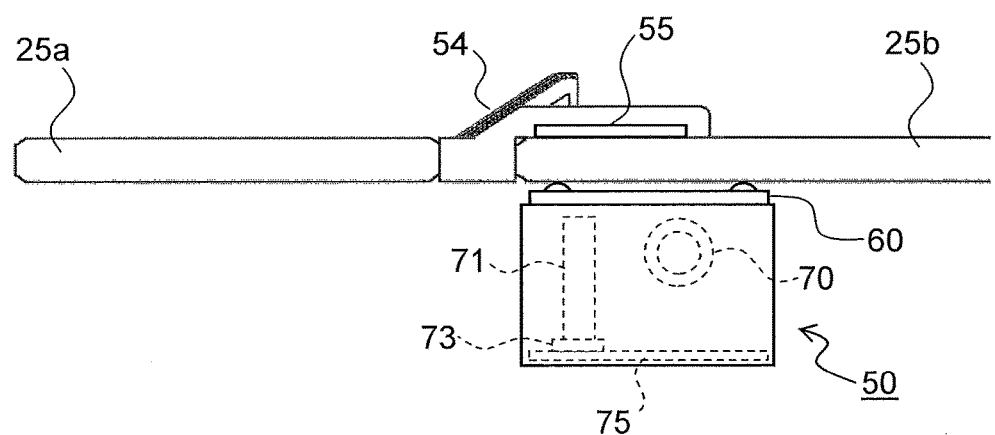
FIG. 3 is an enlarged view of, and around, a front-side reading module 50 shown in FIG. 2, and shows a state where the front-side reading module 50 is disposed at a reference position.
Figure 4:
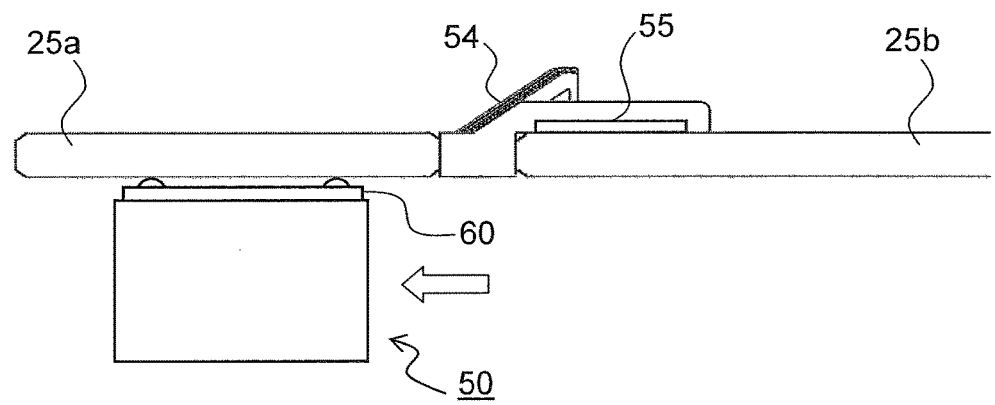
FIG. 4 is an enlarged view of, and around, the front-side reading module 50 shown in FIG. 2, and shows a state where the front-side reading module 50 is disposed at an image reading position.

FIG. 3 and FIG. 4 are enlarged view of and around the front-side reading module 50 and the front-side white reference plate 55, respectively showing states where the front-side reading module 50 is at a reference position (a home position) and at an image reading position. As shown in FIG. 3, the front-side reading module 50 is a reading module of a contact image sensor (CIS) method, and has provided therein a light source 70, a condenser lens 71 composed of a plurality of lens elements, and a complementary metal-oxide semiconductor (CMOS) sensor 73 as reading means. The front-side reading module 50 is configured such that light emitted from the light source 70 is reflected by a document sheet (not shown) to be then condensed by the condenser lens 71 and directed to the CMOS sensor 73. The CMOS sensor 73 is supported on a CCD board 75. The front-side reading module 50 is in contact with a rear side of the contact glass 25 via a slider 60.

Although a description of the back-side reading module 51 (see FIG. 2) is omitted here, the back-side reading module 51 also is of the CIS method, and is similar to the front-side reading module 50 in having a light source 70, a condenser lens 71, a CMOS sensor 73, and a CCD board 75. The back-side reading module 51 is of the same product number (model number) as the front-side reading module 50, and has the same light source 70, the same condenser lens 71, the same CMOS sensor 73, and the same CCD board 75 as the front-side reading module 50.

Next, a description will be given of the shading correction performed by the front-side reading module 50 in a case where reading is performed in the image reading portion 6 of the present embodiment with respect to an image on one side of a document sheet. First, as shown in FIG. 3, the front-side reading module 50 is disposed at the home position, and white reference data of the front-side white reference plate 55 disposed below the conveyance guide 54 is read. Specifically, acquired as the white reference data is an output level of the CMOS sensor 73 observed when the light source 70 is turned on and light emitted therefrom is reflected by the front-side white reference plate 55 to be condensed by the condenser lens 71 and directed to the CMOS sensor (acquisition of white reference). An output level of the CMOS sensor 73 observed when the light source 70 is turned off is acquired as black reference data (acquisition of black reference).

In acquiring the white reference data, it is preferable to perform sampling of the white reference data at a plurality of lines in a sub-scanning direction (the direction in which the front-side reading module 50 moves, that is, the left-right direction as seen in FIG. 3) on the front-side white reference plate 55 while moving the front-side reading module 50 toward an upstream side in a document conveyance direction (leftward as seen in FIG. 3) and average the acquired pieces of the white reference data. This manner of acquisition makes it possible to eliminate negative effects of a black dot or dust that may exist on the front-side white reference plate 55.

With the above configuration, in the case of reading an image of a document sheet in the document stationary method, first, the document sheet (not shown) is placed on the manual document reading glass 25b with its front side facing down. Then, while irradiating an image side (here, the front side) of the document sheet with light from the light source 70, the front-side reading module 50 is moved at a predetermined speed from a scanner home side (a left side as seen in FIG. 2) to a scanner return side (a right side as seen in FIG. 2). As a result, the light shone on the image side is reflected therefrom as image light and forms an image on the CMOS sensor 73. At the CMOS sensor 73, the image light forming the image is divided into pixels to be converted into an electrical signal representing density of each pixel, whereby reading of the image is performed.

On the other hand, in the case of reading an image of a document sheet in the sheet through method, as shown in FIG. 4, the front-side reading module 50 is moved to a position directly under the automatic document reading glass 25a. Then, document sheets are sequentially conveyed by the automatic document feeder 27 toward the automatic document reading glass 25a, and the front side of each document sheet is irradiated with the light from the light source 70 when each document sheet passes over the automatic document reading glass 25a while being lightly pressed by the document pressing member 53. Then, image light reflected from the image side of each document forms an image on the CMOS sensor 73, whereby reading of the image is performed.

A first challenge to be addressed in the case of continuously reading images on document sheets by the sheet through method is, for example, variation in sensor output and variation in density of each pixel resulting from rise in temperature of the CMOS sensor 73 caused by heat from the light source 70. As means to correct the variation in sensor output, there is a method in which reading of an image is performed after the reacquisition of the black reference data and the white reference data.

In the case of reacquiring the black reference data, the light source 70 of the front-side reading module 50 is turned off in an interval between document sheets, and the black reference data is acquired at the image reading position. On the other hand, in the case of reacquiring the white reference data, it is necessary to read the front-side white reference plate 55 disposed at a position (the home position) different from the image reading position. For this purpose, the conveyance of document sheets is suspended, and after the white reference data is reacquired, reading of the document sheets is restarted. The reacquisition of the white reference data in every interval between document sheets significantly degrades productivity (reading efficiency) in the continuous reading of document sheets. To prevent this, it is desirable to reduce the number of times of reacquisition of the white reference data by using means for detecting a time when it becomes necessary to reacquire the white reference data.

A second challenge to be addressed in the case of continuously reading images on document sheets by the sheet through method is, for example, streaks that may occur in an image when a foreign object such as paper powder has adhered to the automatic document reading glass 25a. As means to reduce negative effects of such a foreign object, there is a method in which the image reading position is changed by moving the front-side reading module 50.

To judge whether it is necessary to change the image reading position because of adhesion of a foreign object, it is necessary to detect whether the sensor output has been lowered at a same position in the main scanning direction in margins at leading and rear ends of one document sheet, and in an interval between document sheets. Note that not only in the method in which the image reading position is physically changed but also in the method in which pixel data of where a foreign object has adhered is complemented with peripheral pixel data to reduce occurrence of streaks, it is necessary to perform foreign-object detection.

Further, in the case where the reacquisition of the black or white reference data and the detection of a foreign object are performed in intervals between document sheets that are being subjected to continuous reading, detection of variation in output of the CMOS sensor 73, detection of adhesion of a foreign object to the automatic document reading glass 25a, turning on/off of the light source 70, switching between image reading mode and reference data reading mode, etc. are performed in an interval between document sheets, and this requires securing a sufficient time in an interval between document sheets. Furthermore, detection of variation in sensor output or for adhesion of a foreign object is performed by, for example, detecting a peak value from sensor output data, and this invites another challenge of, for example, preparing an extra memory to prevent loss of stored data of document images.

To cope with such challenges, in the present embodiment, in the case of continuously reading one-sided document sheets by the sheet through method, necessity of the reacquisition of the black reference data and the white reference data at the front-side reading module 50 is detected by using the back-side reading module 51, which is not currently being used for document reading.

Figure 5:
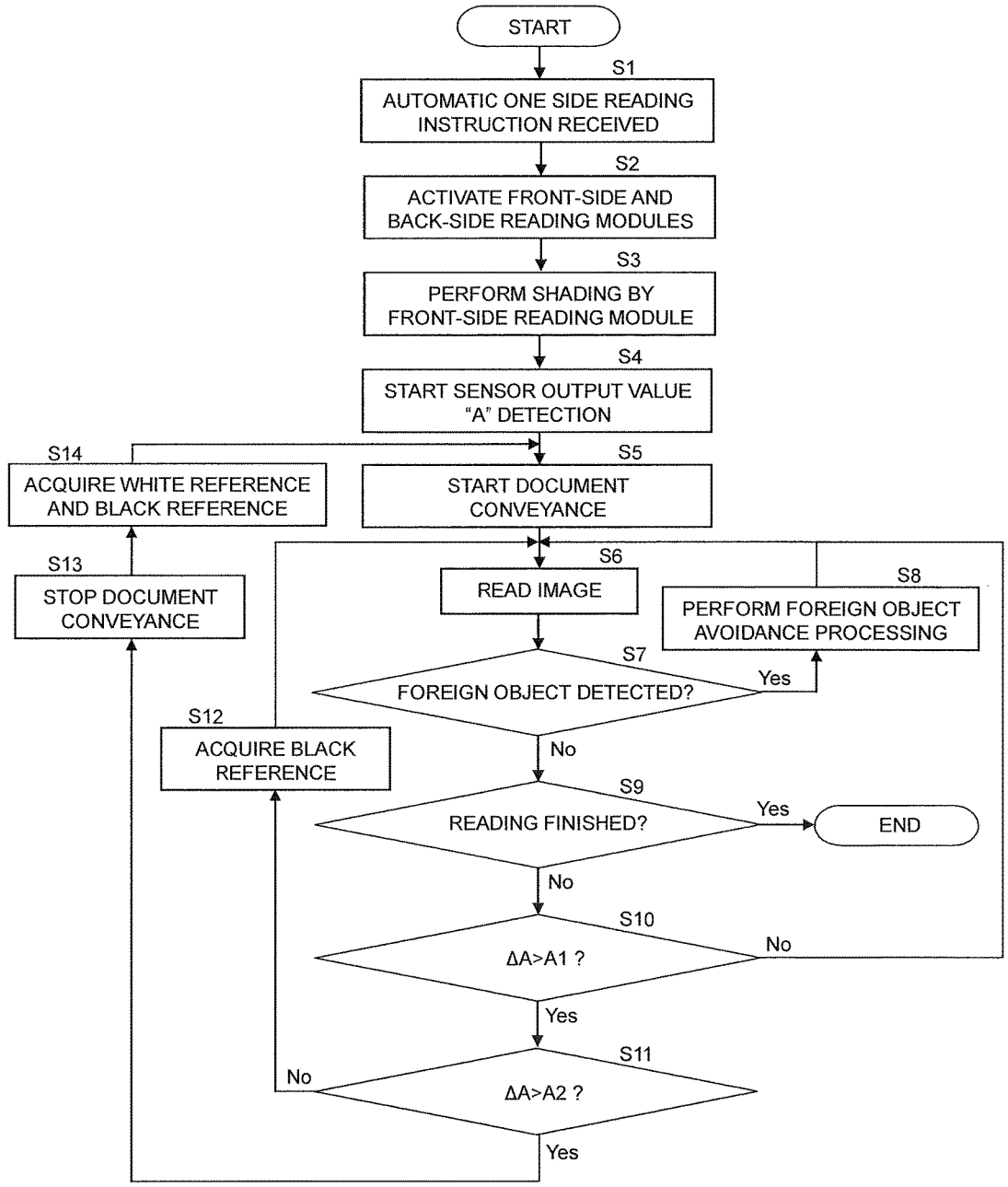
FIG. 5 is a flowchart showing an example of control performed in a case of continuously reading one-sided document sheets by a sheet through method at the image reading portion 6 of the present embodiment.

FIG. 5 is a flowchart showing an example of control performed in the case of continuously reading one-sided document sheets by the sheet through method at the image reading portion 6 of the present embodiment. Referring to FIG. 1 to FIG. 4 as necessary, a description will be given of the procedure of one-side reading by the sheet through method, in relation to the steps shown in FIG. 5.

On receiving an instruction to perform automatic one-side reading by the sheet through method (Step S1), a control portion 90 activates the front-side reading module 50 and the back-side reading module 51 (Step S2). The control portion 90 performs initialization of the front-side reading module 50, which is going to be used for image reading, such as gain adjustment, offset adjustment, and the like. On the other hand, as for the reading module 51, which is not going to be used for image reading, the control portion 90 turns off the light source 70 to achieve a state that allows detection of an output value A (a dark output value) of the CMOS sensor 73.

Next, the control portion 90 performs shading correction (acquires the white reference and the black reference) of the front-side reading module 50 (Step S3). Then, the control portion 90 starts detection of the sensor output value A of the back-side reading module 51 (Step S4), and also starts document conveyance by means of the automatic document feeder 27 (Step S5). Then, the front-side reading module 50 is moved to the image reading position (see FIG. 4), and starts image reading (Step S6).

The control portion 90 judges, based on image data of a first document sheet read by the front-side reading module 50, whether a foreign object has been detected at the image reading position (Step S7). Specifically, presence or absence of reduction in output value of the CMOS sensor 73 at a same pixel in the main scanning direction is detected in a margin at a leading or rear end of the image data of the first document sheet, or in an interval between document sheets.

When a foreign object is detected (YES in Step S7), foreign object avoidance processing is performed in which the reading position is changed by moving the front-side reading module 50 by a predetermined distance in the sub scanning direction (rightward or leftward as seen in FIG. 4) (Step S8), and returning to Step S6, the control portion 90 shifts to reading of a next document sheet. Here, as the foreign-object avoidance processing, instead of changing the position where an image is read by the front-side reading module 50, it is possible to complement data of a pixel to which a foreign object has adhered with data of surrounding pixels.

When no foreign object has been detected in Step S7 (NO in Step S7), it is judged whether the reading operation is still going on (Step S9). When it is found that the reading operation has been ended (YES in Step S9), the automatic one-side reading is ended.

When the reading operation is found to be still going on in Step S9 (NO in Step S9), the control portion 90 judges whether a variation amount $\Delta A$ of the sensor output value A of the back-side reading module 51 with respect to a latest piece of the black reference data acquired immediately therebefore (here, at the start of the reading in Step S3) has exceeded a predetermined value A1 (Step S10). When $\Delta A > A1$ holds (YES in Step S10), then, next, it is judged whether the variation amount ΔA of the sensor output value A has exceeded a predetermined value A2 (A1<A2) (Step S11). When A1<ΔA≤A2 holds (NO in Step S11), the control portion 90 transmits a control signal to the front-side reading module 50 to turn off the light source 70 of the front-side reading module 50, and reacquires the black reference data (Step S12). After that, returning to Step S6, the control portion 90 shifts to reading of a next document sheet, and performs the same reading processing as described above.

On the other hand, when ΔA>A2 holds (YES in Step S11), the control portion 90 causes the automatic document feeder 27 to stop the document conveyance (Step S13), and moves the front-side reading module 50 to the home position (the position shown in FIG. 3). Then, the control portion 90 turns on the light source 70 to reacquire the white reference data, and turns off the light source 70 to reacquire the black reference data (Step S14). After that, the control portion 90 moves the front-side reading module 50 back to the image reading position (the position shown in FIG. 4); and then, returning to step S5, restarts document conveyance and perform the same reading processing as described above.

On the other hand, when ΔA≤A1 holds in Step S10 (NO in Step S10), the control portion 90 reacquires neither the black reference data nor the white reference data, and the control portion 90 returns to step S6 to shift to reading of a next document sheet and perform the same reading processing as described above.

As has been described above, in the image reading portion 6 of the present embodiment, in the continuous one-side (front-side) reading by the sheet through method, based on the sensor output value of the back-side reading module 51, which is not being used for image reading, detection is performed of whether the front-side reading module 50 needs to reacquire the black reference data or the white reference data. Then, based on image data of a document sheet read by the front-side reading module 50, detection is performed of adhesion of a foreign object to the image reading position. This makes it possible to shorten the interval between document sheets in the continuous one-side reading, and thus to enhance the productivity (reading efficiency) while securing a satisfactory image quality.

Further, when A1<ΔA≤A2 holds with respect to the variation amount ΔA of the sensor output value A of the back-side reading module 51 with respect to the latest piece of the black reference data that has been acquired immedeately therebefore, only the black reference data is reacquired, and when ΔA>A2 holds, the black reference data and the white reference data is reacquired. As a result, it is possible to reduce performance frequency of reacquisition of the white reference data, during which the conveyance of document sheets needs to be suspended, to a necessary minimum. Thus, it is possible to further enhance the productivity (reading efficiency) of the image reading portion 6.

Moreover, in the present embodiment, the front-side reading module 50 and the back-side reading module 51 are of the same product number (model number), and accordingly their CMOS sensors 73 are also identical to each other in temperature characteristics, etc. This makes it possible to use the sensor output value A of the back-side reading module 51 to make an accurate decision on whether it is necessary for the front-side reading module 50 to reacquire the black reference data and the white reference data.

Here, even in a case where the front-side reading module 50 and the back-side reading module 51 are not of the same product number (model number), as long as they are of CIS type, they are similar to each other to some extent in tendency of variation in sensor output value in response to temperature variation. Thus, it is possible to determine, based on the sensor output value A of the back-side reading module 51, whether it is necessary for the front-side reading module 50 to reacquire the black reference data and the white reference data.

As a reading method for the front-side reading module 50, there may be adopted a CCD sensor method in which a charge coupled device referred to as CCD in acronym is used.

The CCD sensor method is advantageous in that, with the CCD sensor method, in which the depth of field is large, focusing is easy even with respect to a deep document sheet, and thus even when a document sheet in a book or a document sheet having an uneven surface is not in close contact with the contact glass, uniform reading can be achieved, and a fast reading (scanning) speed can also be secured. On the other hand, the CCD sensor method is disadvantageous in that it requires a mirror for directing image light to the CCD sensor, which invites a complicated and large structure and high cost of a scanner unit.

When using a front-side reading module 50 of the CCD sensor method and a back-side reading module 51 of the CIS method, they are different in tendency of variation in sensor output value in response to variation in temperature. In that case, a relationship between temperature characteristics of the CCD sensor used as the front-side reading module 50 and temperature characteristics of the CMOS sensor used as the back-side reading module 51 is grasped and stored in a storage area such as a ROM or a RAM in advance. This makes it possible to determine, based on the sensor output value A of the back-side reading module 51, whether it is necessary for the front-side reading module 50 to reacquire the black reference data and the white reference data.

It should be understood that the present disclosure is not limited to the above embodiments, and various modifications are possible within the scope of the present disclosure. For example, the above embodiments have been described dealing with the image reading portion 6 incorporated in the image forming apparatus 100, as an example of the image reader, but the present disclosure is applicable, in a completely similar manner, to an image scanner that is used as a device separate from the image forming apparatus 100.

The present disclosure is usable in an image reader including a front-side reading module that reads a front side of a document sheet and a back-side reading module that reads a back side of a document sheet. By using the present disclosure, it is possible to provide an image reader that exhibits high productivity while securing a satisfactory image quality in continuous one-side reading of document sheets, and an image forming apparatus including such an image reader.

What is claimed is:

1. An image reader comprising:
   a contact glass that is fixed to an upper surface of a scanner frame and divided into a manual document reading glass and an automatic document reading glass;
   an automatic document feeder that is openable and closable with respect to the contact glass in an up-down direction and conveys a document sheet to an upper surface of the automatic document reading glass;
   a first reading module
      that is disposed below the contact glass so as to be reciprocatable in a sub scanning direction,
      that is capable of reading an image on a front side of a document sheet laid on the manual document reading glass while moving in the sub scanning direction, and that is also capable of reading an image on a front side of a document sheet conveyed to the upper surface of the automatic document reading glass while remaining stationary at a reading position that faces the automatic document reading glass;

a second reading module that is disposed inside the automatic document feeder, and capable of reading an image on a back side of a document sheet conveyed to the upper surface of the automatic document reading glass; and a controller that determines whether it is necessary for the first reading module to reacquire the black reference data or the white reference data, wherein the first reading module and the second reading module each includes a light source and a sensor that reads, as image light, reflection light of light emitted from the light source, the first reading module and the second reading module being each capable of performing shading correction in which black reference data is acquired through reading performed by the sensor with the light source turned off, and white reference data is acquired through reading performed by the sensor at a position facing a white reference plate, with the light source turned on, in a case of performing continuous one-side reading in which the first reading module continuously reads images on front sides of document sheets conveyed to the upper surface of the automatic document reading glass by the automatic document feeder, during the continuous one-side reading the controller makes the second reading module perform reading with the light source turned off and outputs, as a dark output value, a sensor output value obtained in the reading, and the controller reacquires the black reference data of the first reading module when a variation amount of the dark output value with respect to a latest piece of the black reference data of the first reading module acquired immediately therebefore exceeds a predetermined value A1, and the controller first reading module reacquires both the black reference data and the white reference data of the first reading module when the variation amount of the dark output value with respect to the latest piece of the black reference data of the first reading module acquired immediately therebefore exceeds a predetermined value A2, the predetermined value A2 being larger than the predetermined value A1.

2. The image reader according to claim 1, wherein the second reading module continuously outputs the dark output value in the continuous one-side reading.

3. The image reader according to claim 1, wherein in a case where reacquisition of the white reference data by the first reading module is performed, the reacquisition of the white reference data is performed by suspending document conveyance by the automatic document feeder and moving the first reading module from the reading position to a position facing the white reference plate, and after the reacquisition of the white reference data, the first reading module is moved back to the reading position, and document conveyance by the automatic document feeder is restarted.

4. The image reader according to claim 3, wherein in a case where the white reference data is acquired, the white reference data is acquired at a plurality of lines on the white reference plate in the sub scanning direction while moving the first reading module, and acquired pieces of the white reference data acquired are averaged.

5. The image reader according to claim 1, wherein the first reading module detects adhesion of a foreign object to the reading position based on image data of a document sheet that is being subjected to the continuous one-side reading.

6. The image reader according to claim 5, wherein the first reading module detects adhesion of a foreign object to the reading position by detecting presence or absence of reduction in sensor output value at a same pixel in the main scanning direction in a margin at a leading or rear end of the image data of the document sheet that is being subjected to the continuous one-side reading, or in an interval between document sheets.

7. The image reader according to claim 1, wherein the first reading module and the second reading module are contact imaging sensors, and the light source and the sensor of the first reading module are respectively identical to the light source and the sensor of the second reading module.

8. An image forming apparatus comprising the image reader of claim 1.

* * * * *